(12) United States Patent
Perron et al.

(10) Patent No.: US 10,014,935 B2
(45) Date of Patent: *Jul. 3, 2018

(54) MULTIPLE-ACQUISITION OTDR METHOD AND DEVICE

(71) Applicant: EXFO INC., Québec (CA)

(72) Inventors: Stéphane Perron, Levis (CA); Michel Leblanc, Québec (CA)

(73) Assignee: EXFO INC., Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,486

(22) Filed: Feb. 8, 2017

(65) Prior Publication Data

US 2017/0149496 A1    May 25, 2017

Related U.S. Application Data

(63) Continuation of application No. 14/860,277, filed on Sep. 21, 2015, now Pat. No. 9,571,186, which is a
(Continued)

(51) Int. Cl.
*G01N 21/00* (2006.01)
*H04B 10/071* (2013.01)
*G01M 11/00* (2006.01)

(52) U.S. Cl.
CPC ....... *H04B 10/071* (2013.01); *G01M 11/3127* (2013.01); *G01M 11/3136* (2013.01); *G01M 11/3145* (2013.01)

(58) Field of Classification Search
CPC ..... G01N 21/00; G01N 21/84; G01M 11/335; G01M 11/332; H04B 10/00; H04B 10/20; H04B 10/24; H04B 10/08
(Continued)

(56) References Cited

U.S. PATENT DOCUMENTS

| 3,973,258 A | 8/1976 | Cerni et al. |
| 4,104,582 A | 8/1978 | Lambertsen |

(Continued)

FOREIGN PATENT DOCUMENTS

| EP | 1126265 A1 | 8/2001 |
| EP | 1236985 A2 | 9/2002 |

(Continued)

OTHER PUBLICATIONS

Acterna Saint-Etienne; "Guide to Fiber Optic Measurements," Date: Nov. 2000.
(Continued)

*Primary Examiner* — Tu Nguyen
(74) *Attorney, Agent, or Firm* — Erise IP, P.A.

(57) ABSTRACT

An OTDR device and method for characterizing one or more events in an optical fiber link are provided. A plurality of light acquisitions is performed. For each light acquisition, test light pulses are propagated in the optical fiber link and the corresponding return light signals from the optical fiber link are detected. The light acquisitions are performed under different acquisition conditions, for example using different pulsewidths or wavelengths. Parameters characterizing the event are derived using the detected return signal from at least two of the plurality of light acquisitions.

18 Claims, 6 Drawing Sheets

Related U.S. Application Data continuation of application No. 14/044,768, filed on Oct. 2, 2013, now Pat. No. 9,170,173, which is a continuation of application No. 13/699,982, filed as application No. PCT/CA2011/000625 on May 26, 2011, now Pat. No. 8,576,389.

(60) Provisional application No. 61/482,234, filed on May 4, 2011, provisional application No. 61/349,013, filed on May 27, 2010.

(58) Field of Classification Search
USPC .................................................. 356/73.1
See application file for complete search history.

(56) References Cited

U.S. PATENT DOCUMENTS

| | | | |
|---|---|---|---|
| 4,289,398 A | 9/1981 | Robichaud | |
| 4,397,551 A | 8/1983 | Bage et al. | |
| 4,823,166 A | 4/1989 | Hartog et al. | |
| 4,893,006 A | 1/1990 | Wakai et al. | |
| 4,898,463 A | 2/1990 | Sakamoto et al. | |
| 4,963,020 A * | 10/1990 | Luthra | G01M 11/3145 356/73.1 |
| 5,066,118 A * | 11/1991 | Buerli | G01M 11/3145 250/227.15 |
| 5,069,544 A * | 12/1991 | Buerli | G01M 11/3145 356/73.1 |
| 5,093,568 A | 3/1992 | Maycock | |
| 5,155,439 A | 10/1992 | Holmbo et al. | |
| 5,179,420 A | 1/1993 | So et al. | |
| 5,323,224 A | 6/1994 | Wada | |
| 5,365,328 A | 11/1994 | Anderson | |
| 5,373,356 A | 12/1994 | Anderson | |
| 5,491,548 A | 2/1996 | Bell et al. | |
| 5,528,356 A | 6/1996 | Harcourt | |
| 5,534,994 A | 7/1996 | Hanson et al. | |
| 5,592,282 A | 1/1997 | Hartog | |
| 5,596,409 A | 1/1997 | Marcus et al. | |
| 5,686,986 A | 11/1997 | Li et al. | |
| 5,708,500 A | 1/1998 | Anderson | |
| 5,731,869 A | 3/1998 | Minami | |
| 5,754,284 A | 5/1998 | Leblanc et al. | |
| 5,825,479 A | 10/1998 | Thompson et al. | |
| 5,929,982 A | 7/1999 | Anderson | |
| 5,963,313 A | 10/1999 | Anderson | |
| 6,009,220 A | 12/1999 | Chan et al. | |
| 6,445,445 B1 | 9/2002 | Nakayama et al. | |
| 6,519,026 B1 | 2/2003 | Holland | |
| 6,542,228 B1 | 4/2003 | Hartog | |
| 6,611,322 B1 | 8/2003 | Nakayama et al. | |
| 6,781,678 B2 | 8/2004 | Aoki et al. | |
| 6,970,247 B2 | 11/2005 | Yankielun | |
| 7,016,024 B2 | 3/2006 | Bridge et al. | |
| 7,042,559 B1 | 5/2006 | Frigo et al. | |
| 7,088,436 B2 | 8/2006 | Saunders et al. | |
| 7,284,903 B2 | 10/2007 | Hartog | |
| 7,415,206 B1 | 8/2008 | Birk et al. | |
| 7,593,098 B2 | 9/2009 | Brendel | |
| 7,620,513 B2 | 11/2009 | Nakayama et al. | |
| 7,668,411 B2 | 2/2010 | Davies et al. | |
| 7,859,654 B2 | 12/2010 | Hartog | |
| 7,995,209 B2 | 8/2011 | Hartog | |
| 8,134,696 B2 | 3/2012 | Hartog | |
| 8,213,002 B2 | 7/2012 | Kassler et al. | |
| 8,222,906 B2 | 7/2012 | Wyar et al. | |
| 8,406,620 B2 | 3/2013 | Khermosh et al. | |
| 8,660,423 B2 | 2/2014 | Vandewege et al. | |
| 8,687,957 B2 | 4/2014 | Perron | |
| 8,724,102 B2 | 5/2014 | Urban | |
| 2003/0030786 A1 | 2/2003 | Shurgalin et al. | |
| 2005/0174563 A1 | 8/2005 | Evans et al. | |
| 2006/0245468 A1 | 11/2006 | Hartog | |
| 2008/0100828 A1 | 5/2008 | Cyr et al. | |
| 2009/0086193 A1 | 4/2009 | Aoki | |
| 2009/0190921 A1 | 7/2009 | Nakajima et al. | |
| 2010/0002226 A1 | 1/2010 | Hartog | |
| 2011/0149270 A1 | 6/2011 | Nagel et al. | |
| 2012/0067118 A1 | 3/2012 | Hartog et al. | |
| 2013/0148958 A1 | 6/2013 | Liang et al. | |
| 2013/0222811 A1 | 8/2013 | Handerek | |

FOREIGN PATENT DOCUMENTS

| | | |
|---|---|---|
| GB | 2182222 B | 5/1987 |
| JP | 2007093405 | 4/2007 |
| WO | 2009018235 | 2/2009 |
| WO | 2009137823 | 11/2009 |
| WO | 2010043056 | 4/2010 |

OTHER PUBLICATIONS

Acterna Saint-Etienne; "User Manual MTSe 5000 Series," Date: Aug. 2002.
Anderson, D, et al.; "Troubleshooting Optical-Fiber Networks," 2nd Edition, Date: Copyright 2004.
Declaration of Duncan L. MacFarlane, Ph.D., P.E. dated Oct. 28, 2016; U.S. Pat. No. 8,576,389; Case No. IPR2017-00138; Title: Multiple-Acquisition OTDR Method and Device.
Declaration of Duncan L. MacFarlane, Ph.D., P.E. dated Oct. 28, 2016; U.S. Pat. No. 9,170,173; Case No. IPR2017-00139; Title: Multiple-Acquisition OTDR Method and Device.
El-Sayed, Mahmood, et al.; "Investigation of the Precision Regarding Fiber Fault Location with a Commercial Optical Time Domain Reflectometer," IEEE, pp. 237-241, Date: 2010.
Enomoto, Y. et al., Over 31.5 dB Dynamic Range Optical Fiber Line Testing System with Optical Fiber Fault Isolation Function for 32-Branched PON, Thursday Afternoon, OFC 2003, vol. 2, pp. 608-609, NTT Access Network Service Systems Laboratories, Tsukuba, Japan.
*EXFO, Inc & EXFO America, Inc* vs. *Viavi Solutions, Inc.*, "Defendant, Viavi Solutions Inc.'s P.R. 3.3 and 3.4 Invalidity Contentions and Disclosures," E.D. Tex., Marshall Div., Case No. 2:15-cv-1685-RWS, Date: Apr. 26, 2016.
Extended European Search Report dated May 29, 2015; European Patent Application No. 11785951.2; Applicant: Exfo Inc.
Hewlett-Packard; "HP E6000A Mini-OTDR," Date: Jan. 1999.
International Search Report dated Sep. 7, 2011, in International Application No. PCT/CA2011/000625; International Filing Date: May 26, 2011; Applicant: Exfo Inc.
Invalidity Search for U.S. Pat. No. 8,576,389; Report Dated: Aug. 13, 2015.
JDSU; "4100 OTDR Modules," Date: Copyright 2008.
JDSU; "8100 Modules Series," Date: Copyright 2006.
JDSU; "MTS/T-BERD 8000; P12385 Release Note," Date: 2012.
JDSU; "Optical Fiber Cable OFS-200 Software," Date: Copyright 2009.
JDSU; "Reference Guide to Fiber Optic Testing," Date: Copyright 2007.
JDSU; "T-BERD/MTS-2000 Handheld Modular Test Set; Fiber Optic Multi-Test Tool for Smarter, Faster Field Testing," www.jdsu.com/test, Post date: Unknown.
JDSU; "T-BERD/MTS-6000 Platform; Compact Optical Test," www.jdsu.com/test, Date: Feb. 2013.
Joint Claim Construction Statement, Exhibit A, filed in *Exfo Inc.* v. *Viavi Solutions, Inc.*, 2:15-cv-1685-RWS (E.D. Tex.); Filed: Jun. 22, 2016.
Written Opinion of the International Searching Authority dated Sep. 7, 2011, in International Application No. PCT/CA2011/000625; International Filing Date: May 26, 2011; Applicant: Exfo Inc.
Kapron, Felix P. et al.; Fiber-Optic Reflection Measurements Using OCWR and OTDR Techniques; Journal of Lightwave Technology; vol. 7, No. 8; Dated: Aug. 1989; <http://ieeexplore.ieee.org/stamp/stamp.jsp?tp=&arnumber=32388&isnumber=1404>.
Koshikiya, Y. et al., Newly Developed Optical Fiber Line Testing System Employing Bi-Directional OTDRs for PON and In-Service

(56) References Cited

OTHER PUBLICATIONS

Line Testing Criteria, Ieice Trans. Commun., vol. E90-B, No. 10, Oct. 2007, pp. 2793-2802, The Institute of Electronics, Information and Communication Engineers.

Legré, Matthieu et al.; High resolution optical time domain reflectometer based on 1.55 μm up-conversion photon-counting module; Optical Society of America; Dated: 2007; <https://www.osapublishing.org/oe/fulltext.cfm?uri=oe-15-13-8237&id=138571>.

Zhang, Ziyi et al.; Distributed optical fiber vibration sensor based on spectrum analysis of Polarization-OTDR system; Optical Society of America; Dated: 2008; <https://www.osapublishing.org/oe/fulltext.cfm?uri=oe-16-14-10240&id=165522>.

Naik, Suketu, et al.; "Multicarrier Reflectometry," IEEE Sensors Journal, vol. 6, No. 3, pp. 812-818, Jun. 2006.

Notification of Transmittal of International Preliminary Report on Patentability dated Oct. 1, 2012, in International Application No. PCT/CA2011/000625; International Filing Date: May 26, 2011; Applicant: Exfo Inc.

Petition for Inter Partes Review dated Oct. 28, 2016; U.S. Pat. No. 8,576,389; Case No. IPR2017-00138; Title: Multiple-Acquisition OTDR Method and Device.

Petition for Inter Partes Review dated Oct. 28, 2016; U.S. Pat. No. 9,170,173; Case No. IPR2017-00139; Title: Multiple-Acquisition OTDR Method and Device.

ProQuest; "JDSU Introduces Multi-mode/Single-mode OTDR with Five Wavelength Test Capability," PR Newswire, copyright Dec. 18, 2007, retrieved from Internet: http://search.proquest.com/printviewfile?accountip=10920.

Reunert, Michael; "OTDR: Characterizing a Fiberoptic Network," Fiberoptic Product News, pp. 32-34, Date: Dec. 2001.

Reunert, Michael; "Software Tools Improve Fiber-Optic Network Testing," Communications News, vol. 40, Issue 2, pp. 38-41, Feb. 2002.

Tektronix, Optimize Quality of Service in Fiber Optic Networks with Intelligent OTDRs, IntelliTrace Technical Brief, 2001, www.tektronix.com/commtest.

Tektronix; "Mini Optical Time Domain Reflectometer, Tekranger2 TFS3031," Date: 1999.

Tektronix; "TFS3031 TekRanger/RedRanger 2™ Mini Optical Time-Domain Reflectometer," Date: Copyright 1997.

Viavi; "4100-Series OTDR Modules," Date: 2015.

Wavetek Wandel Goltermann; "MTS 5000 Series," Date: Oct. 1999.

\* cited by examiner

PULSE 1

PULSE 2

PULSE 3

PULSE 1

PULSE 2

PULSE 3

PULSE 1

PULSE 2

PULSE 3    A+B loss

FIG. 4a
PULSE 1
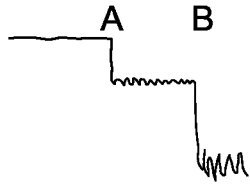
FIG. 4b
PULSE 2
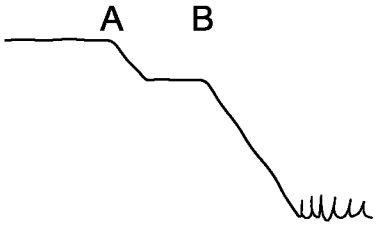
FIG. 4c
PULSE 3
Saturated
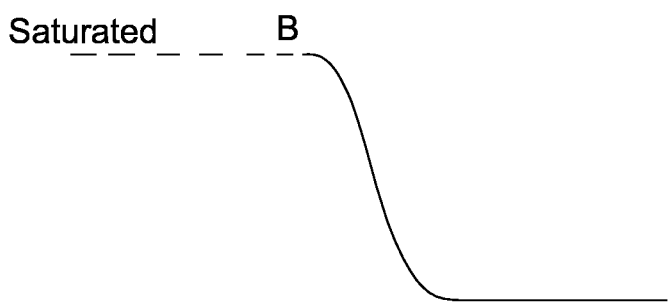
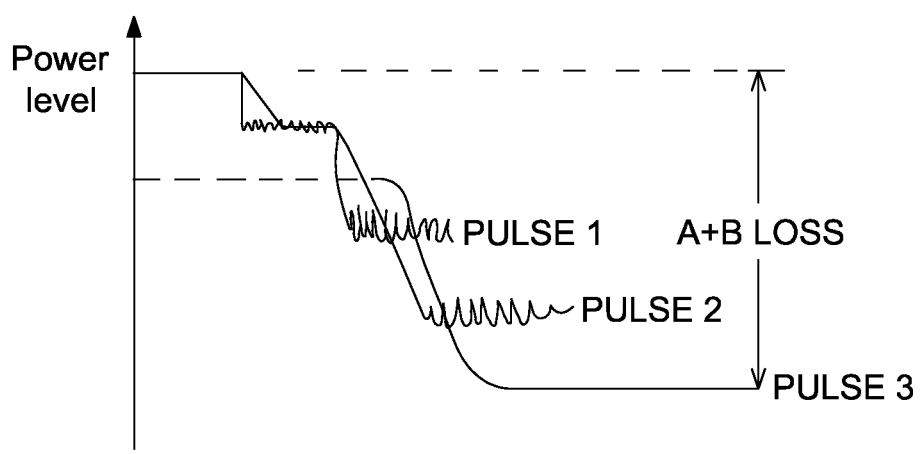
FIG. 4d

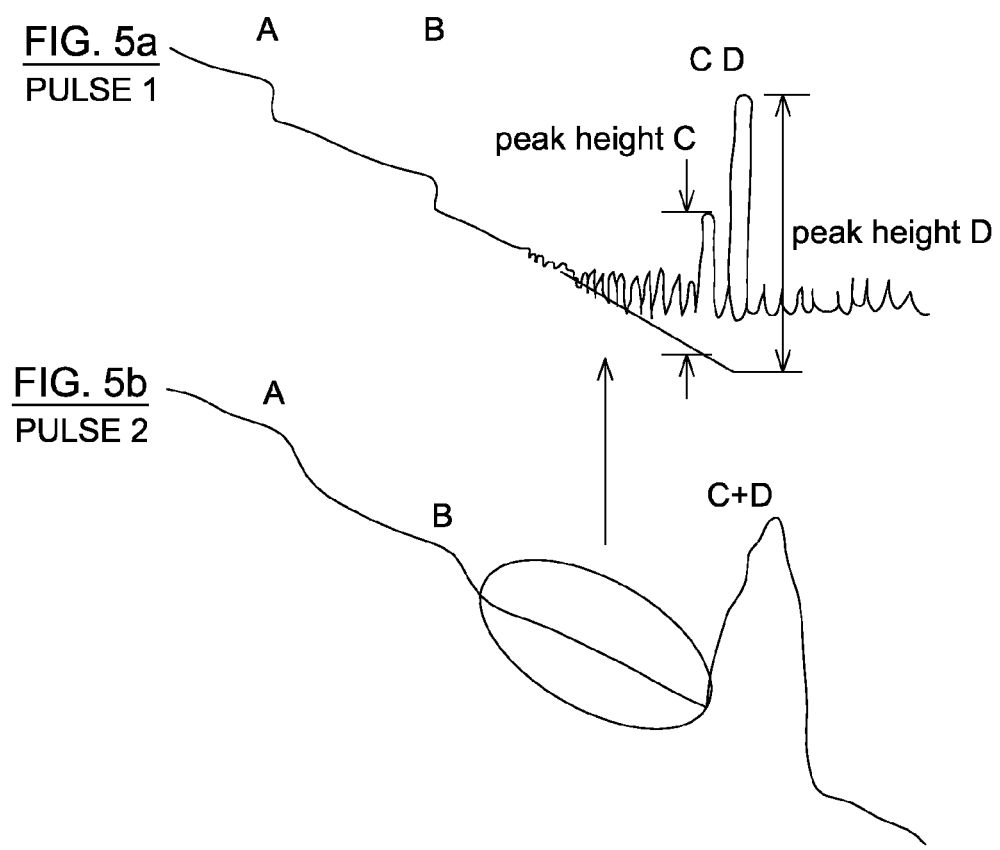

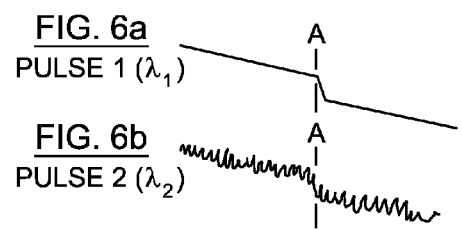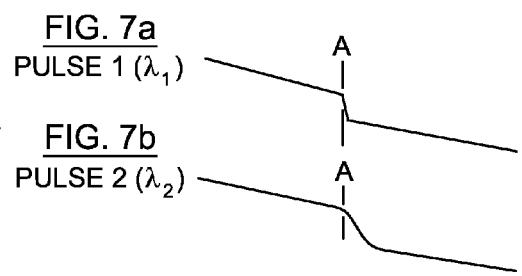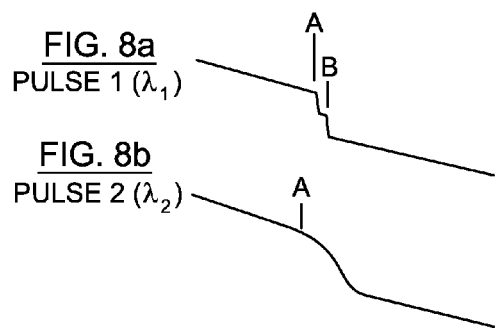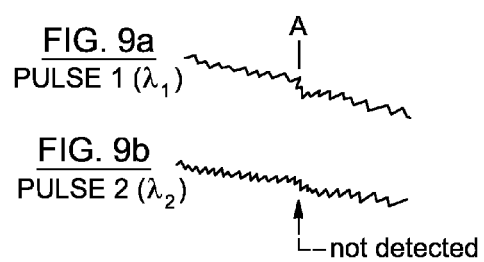

MULTIPLE-ACQUISITION OTDR METHOD AND DEVICE

CROSS-REFERENCE TO RELATED APPLICATIONS

The present application is a continuation patent application and claims priority benefit, with regard to all common subject matter, of U.S. patent application Ser. No. 14/860,277, filed Sep. 21, 2015, and entitled "MULTIPLE-ACQUISITION OTDR METHOD AND DEVICE," which issued as U.S. Pat. No. 9,571,186, on Feb. 14, 2017 ("the '186 Patent"). The '186 Patent is a continuation patent application and claims priority benefit, with regard to all common subject matter, of U.S. patent application Ser. No. 14/044,768, filed Oct. 2, 2013, and entitled "MULTIPLE-ACQUISITION OTDR METHOD AND DEVICE," which issued as U.S. Pat. No. 9,170,173, on Oct. 27, 2015 ("the '173 Patent"). The '173 Patent is a continuation patent application and claims priority benefit, with regard to all common subject matter, of U.S. patent application Ser. No. 13/699,982, filed Nov. 26, 2012, and entitled "MULTIPLE-ACQUISITION OTDR METHOD AND DEVICE," which issued as U.S. Pat. No. 8,576,389, on Nov. 5, 2013 ("the '389 Patent"). The '389 Patent was filed under 35 U.S.C. § 371 and thus, claims priority benefit, with regard to all common subject matter, of International Application No. PCT/CA2011/000625, filed May 26, 2011, and entitled "MULTIPLE-ACQUISITION OTDR METHOD AND DEVICE" ("the PCT Application"). The PCT Application claims priority benefit of U.S. Provisional Application Nos. 61/349,013, dated May 27, 2010, and 61/482,234, dated May 4, 2011. The above-referenced patents and applications are herein incorporated by reference in their entirety.

TECHNICAL FIELD

The present invention relates to the field of Optical Time-Domain Reflectometry (OTDR) and more particularly concerns methods and devices making use of multiple acquisitions made under different acquisition conditions to characterize events in an optical fiber link.

BACKGROUND

Optical Time-Domain Reflectometry (OTDR—also used to refer to the corresponding device) is a diagnostic technique for optical fiber networks where a light pulse is launched along an optical fiber link and the returning light is detected and analyzed. Various events along the fiber link can be detected and characterized through a proper analysis of the returning light in the time domain.

Performing a measurement with traditional OTDR requires the user to specify settings such as pulse characteristics, acquisition range (i.e. the distance light travels within the fiber) and averaging time. A single acquisition is usually performed under the selected user settings. Alternatively, more than one acquisition may be performed by the OTDR within the specified acquisition time, all under the same user settings and therefore using the same pulsewidth, but with different gain settings, receiver bandwidth or pulse power for example. Acquired data from each sub-acquisition is then stitched together, according to their respective noise floor and saturation levels, to build a single graphical x-y representation of the backscattered light referred to as the "trace".

Most OTDRs also provide an automatic mode, where the instrument automatically chooses one appropriate pulse, acquisition range and averaging time. In order to choose the appropriate settings for the final acquisition, the instrument launches one or many short "investigation acquisitions", which provide a quick overview of the link being tested. In general, the investigation acquisitions are hidden from the user, and only the final acquisition is made available.

For both manual settings and automatic settings, the final result is an OTDR trace performed with a single pulse. In general, the pulsewidth will be selected to allow characterization of the complete link. For example, a link with large loss will end up being tested with a long pulse. However, the use of a long pulse brings certain limitations in the ability to characterize short fiber sections, as well as closely spaced events.

An improvement to the single-pulse approach has been developed, whereby the equipment makes use of successive acquisitions performed with increasingly larger pulses. Such an approach is the basis of the Intellitrace Plus™ technology by Tektronix (http://www.tek.com, see also U.S. Pat. No. 5,155,439 (HOLMBO et al) and U.S. Pat. No. 5,528,356 (HARCOURT)). Shorter pulses are used to characterize the near end of the fiber under test. A second acquisition with a larger pulse is then taken, to characterize the portion of the link-under-test that is farther away. The process of taking a new acquisition with a longer pulse is repeated until the end of the fiber under test is found. The information obtained from the different acquisitions is combined to produce a single result; that is, a single composite OTDR trace and/or single event table in which each event is measured using the acquisition that was performed with the smallest pulse possible (i.e. the acquisition that provides a sufficient SNR to perform loss/location/reflectance measurements within a target accuracy). It is to be noted that the number of pulses that is used depends on the link-under-test (only one pulse for a short link, many pulses for a long link). The successive acquisitions can be performed in a dynamic manner, or using a "fixed recipe", that is, always testing with a given sequence of pulses. In practice, differences in gain settings, filtering, bandwidth, etc. may occur for each acquisition.

The "sequential pulses" approach brings a significant improvement to the traditional single-pulse approach, as each event can be characterized by an "optimum" pulse. However, certain drawbacks remain: for example, the optimum pulse for measuring loss is not necessarily the same as the optimum pulse to measure reflectance or to perform event location. Moreover, situations exist where a single pulse cannot characterize an event. There therefore remains a need for an improved OTDR method and device.

SUMMARY

In accordance with an aspect, there is provided an OTDR method for characterizing an optical fiber link, a plurality of events occurring along the optical fiber link. The method includes the following steps:

a) performing a plurality of light acquisitions, each light acquisition comprising propagating at least one test light pulse in the optical fiber link and detecting a return light signal from said optical fiber link for each of said at least one test light pulse. The plurality of light acquisitions is performed under different acquisition conditions wherein the corresponding test light pulses have different pulsewidths;

b) for at least one observed event from said plurality of events, deriving a value for a parameter characterizing the observed event based on:
   a combined loss associated with a combination of the observed event and at least one neighboring event, obtained at least from a first of said light acquisitions; and
   a neighboring loss associated with the neighboring event, obtained at least from a second of said light acquisitions.

In accordance with another aspect, there is also provided a multiple-acquisition OTDR device for characterizing an optical fiber link, a plurality of events occurring along the optical fiber link.

The multiple-acquisition device includes a light acquisition module for performing a plurality of light acquisitions. The light acquisition module includes a light generating assembly coupled to the optical fiber link for generating and propagating in the optical fiber link at least one test light pulse for each light acquisition. The light acquisition module further includes a detecting module for detecting a return light signal from the optical fiber link for each test light pulse. The light acquisition module performs these light acquisitions under different acquisition conditions wherein the corresponding test light pulses have different pulsewidths.

The multiple-acquisition device further includes an analyzing module for analyzing the detected return light signals and deriving, for at least one observed event from said plurality of events, a value for a parameter characterizing the observed event. This deriving is based on:
   a combined loss associated with a combination of the observed event and at least one neighboring event, obtained at least from a first of said light acquisitions; and
   a neighboring loss associated with the neighboring event, obtained at least from a second of said light acquisitions.

In accordance with another aspect, there is also provided a non-transitory computer readable storage medium with a computer program stored thereon. The computer program is operable to perform an OTDR method for characterizing an optical fiber link, wherein a plurality of events occur along the optical fiber link, and wherein the computer program instructs one or more processors to perform the steps of:
a) receiving data from a plurality of light acquisitions, wherein each light acquisition comprises at least one propagated test light pulse in the optical fiber link and a detected return light signal from said optical fiber link for each of said at least one propagated test light pulse,
wherein said plurality of light acquisitions is performed under different acquisition conditions wherein the corresponding test light pulses have different pulsewidths; and
   b) deriving, for at least one observed event from said plurality of events, a value for a parameter characterizing the observed event based on:
      a combined loss associated with a combination of the observed event and at least one neighboring event, obtained at least from a first of said light acquisitions; and
      a neighboring loss associated with the neighboring event, obtained at least from a second of said light acquisitions.

The parameter characterizing the observed event may for example be a loss associated with the observed event, and the deriving of this loss parameter may involve substeps of i. obtaining the combined loss; ii. obtaining the neighboring loss; and iii. subtracting the neighboring loss from the combined loss.

The combined loss may be obtained from more than one light acquisition. In one embodiment, the combined loss may be obtained through normalization of the return light signal from the first light acquisition and the return light signal from a different light acquisition, on a same power scale.

In some implementations, the neighboring loss is substantially free of contributions from the observed event.

In some implementations, a value for at least one of a loss parameter, a position parameter and a reflectance parameter for each event of the plurality of events may be derived. Various manners of deriving values for such parameters using multiple acquisitions may be considered within the scope of the present invention.

Advantageously, combining information from multiple acquisitions taken under different conditions according to embodiments of the invention may recover more information for a given event than a single "optimum" pulse, or even enable measurement not currently possible with a single "optimum" pulse.

Methods and devices according to embodiments of the invention provide the ability to combine the information from different acquisitions in order to characterize a single event. As one skilled in the art will readily understand, this ability of the methods and devices may not be required for all of the events along a given optical fiber link, and the resulting OTDR analysis of such a fiber link may include events characterized using multiple different acquisitions and other events characterized using a single acquisition.

Other features and advantages of the invention will be better understood upon reading the preferred embodiments thereof, with reference to the appended drawings.

BRIEF DESCRIPTION OF THE DRAWINGS

FIGS. 4a to 4c show two events along an optical link as they appear in the trace obtained from three acquisitions using test light pulses of different pulsewidths, according to a fourth example of an embodiment; FIG. 4d shows an overlay of the traces of FIGS. 4a, 4b and 4c.

FIGS. 5a and 5b show several events along an optical link as they appear in the trace obtained from acquisitions using test light pulses of different pulsewidths, according to a fifth example of an embodiment.

FIGS. 6a and 6b show an event measured through acquisitions using test light pulses of different wavelengths and the same pulsewidth, according to a sixth example of an embodiment.

FIGS. 7a and 7b show an event measured through acquisitions using test light pulses of different wavelengths and different pulsewidths, according to a seventh example of an embodiment.

FIGS. 8a and 8b show two events event measured through acquisitions using test light pulses of different wavelengths and the same pulsewidth, according to an eighth example of an embodiment.

FIGS. 9a and 9b also show two events measured through acquisitions using test light pulses of different wavelengths and the same pulsewidth, according to a ninth example of an embodiment.

DESCRIPTION OF PREFERRED EMBODIMENTS

Figure 1A:
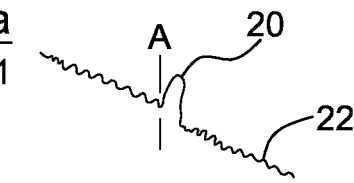
FIGS. 1a, 1b and 1c show an event along an optical link as it appears in the return signal, or "trace", obtained from three acquisitions using test light pulses of different pulsewidths, according to a first example of an embodiment.

As mentioned above, the sequential pulse approach to OTDR brings a significant improvement to the traditional single-pulse approach, since each event is characterized by an "optimum" pulse. However, an optimum pulse for determining one parameter characterizing a given event is not necessarily the optimum pulse to measure the other parameters of this event; for example, the optimum pulse to measure loss may not be ideal or appropriate to measure reflectance or to perform event location. Moreover, situations exist where a single pulse cannot characterize an event at all.

Method According to an Embodiment

In accordance with one aspect, there is provided an OTDR method for characterizing an event in an optical fiber link. This method is preferably performed via a multiple-acquisition OTDR device, as will be explained further below.

The acronym OTDR is understood to refer to "Optical Time-Domain Reflectometry". In accordance with the general understanding of one skilled in the art, OTDR usually involves launching light pulses along an optical fiber link and detecting the returning light, which is analyzed in order to characterize various "events" along the fiber link. It will be readily understood that several variants of OTDR exist and may be devised, and that the use of this designation herein in not meant to limit the scope of the present description to one such variant.

The optical fiber link is preferably embodied by a portion of an optical fiber telecommunication network such as a long-distance network, a Passive Optical Network (PON) or a Local Area Network (LAN). OTDR may, however, also be used in other contexts, such as optical sub-assembly production testing and the like. It will be further understood by one skilled in the art that while the examples below are given within the simplified context of a single fiber link, embodiments of the present invention may be adapted to point-to-multipoint networks, for example combined with High Reflectance Demarcation (HRD) techniques in Passive Optical Networks (PONs).

The light travelling along the fiber link will return towards its point of origin either through backscattering or reflection. The acquisition of the return light signal as a function of time is referred to as the OTDR trace, where the time scale is representative of distance between the OTDR device and a point along the fiber link. "Backscattering" refers to Rayleigh scattering occurring from the interaction of the travelling light with the optical fiber media all along the fiber link, resulting in a generally sloped background light on the OTDR trace, whose intensity disappears at the end of the range of the travelling pulse. Events along the fiber will generally result in a more localized drop of the backscattered light on the OTDR trace, which is attributable to a localized loss, and/or in a reflection peak. It will be understood that an "event" characterized by the OTDR method described herein may be embodied by any perturbation along the fiber link which affects the returning light pulses. Typically, an event may be embodied by an optical fiber splice along the fiber link, which is characterized by a localized loss with little or no reflection. Mating connectors can also generate events which typically present reflectance, although it may be impossible to detect in some instances. OTDR methods and devices may also provide for the identification of events such as a fiber breakage, characterized by substantial localized loss and, frequently, a concomitant reflection peak, as well as loss resulting from a bend in the fiber. Finally, components along the fiber link, for example splitters and the like, may also be deemed "events" generating localized loss.

The OTDR method first includes a step of performing a plurality of acquisitions of the backreflected/backscattered light (hereinafter "light acquisitions"). Each light acquisition is understood to refer to the actions of propagating one or more test light pulses in the optical fiber link and detecting a return light signal from this optical fiber link. The method further involves performing some of these light acquisitions under different acquisition conditions. The expression "different acquisition conditions" is understood in the context of the present description to refer to changing parameters of the test light signals, namely their pulsewidths, wavelengths or both, from one light acquisition to the next. Therefore, the information corresponding to a given event which can be derived from different acquisitions will not necessarily be the same.

One skilled in the art will readily understand that in the context of OTDR methods and devices, each light acquisition generally involves propagating a large number of light pulses in the optical fiber link and averaging the results. Furthermore, the present method may involve performing additional light acquisitions under given acquisition conditions without departing from the scope of the present application. For example, one embodiment of the method may involve two or three different acquisition conditions, and be carried out by performing several light acquisitions for each acquisition condition. It will also be understood that other factors may need to be controlled during the light acquisitions or from one light acquisition to the next, such as gain settings, pulse power, etc. as is well known to those skilled in the art.

The OTDR method further involves deriving one or more parameters characterizing the event using the detected return signals from at least two of the different light acquisitions performed. Hence, instead of selecting the optimum pulse for each event, the method and device combine the return signals obtained from multiple pulses to extract as much information as possible about each event.

It is common in the art to characterize events along an optical fiber link by attributing values to three different parameters: the loss of signal associated with the event, the position of this event along the optical fiber link and the reflectance peak at the event (when present). Depending on the circumstances, a single one or different combinations of these parameters may be evaluated for a given event.

In one embodiment, the method above is performed in an adaptive manner, that is, a first acquisition is performed and the corresponding return light signals are detected and analyzed to obtain a first set of information relative to the event being characterized. A second acquisition is then performed, and the information obtained therefrom is used with the analysis from the first acquisition to complete the characterization of the event. Of course, this sequence may be repeated for additional acquisitions, if necessary. In one embodiment, the pulsewidth and/or other settings associated with the test pulses of light acquisitions subsequent to the first one are determined based on the analysis of the return signals from the previous acquisitions. In another embodiment, the sequence of test pulses of each acquisitions may be performed based on a predetermined routine.

In another embodiment, the analysis step above may be performed only once all of the test pulses have been launched in the fiber and the corresponding return light signals detected.

Various manners of using or combining the detected return signals from different light acquisitions in order to derive one or more parameters characterizing an event will be better understood through the help of specific illustrative examples, provided below. One skilled in the art will readily understand that the present method may be embodied in many different manners and is in no way considered limited to the presented examples.

The first five examples given below will be based on two or three acquisitions taken with pulses having different pulsewidths, but a same wavelength. The different light acquisitions will be called pulse 1, 2 and 3, and will correspond respectively to the acquisitions taken using the shortest, medium and longest pulses. Each event will be named A, B, C, etc. For each event, at least one of the loss parameter, location parameter and reflectance parameter may need to be extracted. On some traces, it is possible that the information from many events is merged together (for example, individual losses for A and B cannot be measured, but total losses for A and B can be measured). For this example, A+B losses will be considered. In practice, the invention is not limited to two or three acquisitions taken with different pulses; it can be extended to a higher acquisition count. In addition, it will be understood that in addition to using multiple different test pulses, for a given test pulse having a given pulsewidth, more than one acquisition may be performed, for example using different gain settings.

In some embodiments, the OTDR method may involve associating a quality factor to the parameters being evaluated for each of the light acquisitions. This quality factor can allow the comparison of the results from the different light acquisitions.

Quality factors are usually based on one or many of the following considerations: pulse width, SNR, sampling resolution, etc. Quality factors can also vary based on the type of event that is looked at (reflective vs. non-reflective, small vs. large loss).

Some simple quality factors are given here as illustrative examples only:
Loss: the shortest pulse acquisition that provides a signal to noise ratio (SNR) above a loss threshold, for example 10 dB;
Location: the acquisition that provides the smallest sampling resolution with a signal to noise ratio (SNR) above a location threshold, for example 8 dB. In general, the smallest sampling resolution is associated with short pulse acquisition;
Reflectance: the shortest pulse acquisition that provides a signal to noise ratio (SNR) above a reflectance threshold, for example 7 dB.

In general, for reflective events, the thresholds for location and reflectance are of a smaller value than the threshold for loss. The chosen threshold values for SNR depend on the application and on the accuracy that is required. These examples of quality criteria are given for illustrative purposes and are not to be considered limitative to the scope of the invention.

For simplicity, in the following examples, quality criteria for each measurement will be given a value that ranges from 1 to 3 (1=poor, 2=acceptable, 3=best). When no measurement is possible, -- will be shown. This scaling and representation is also purely illustrative, and in no way limitative of the scope of protection.

It is to be noted that an OTDR pulse is normally measured in duration (typically from few ns to many µs). Another convenient way to consider an OTDR pulse is to specify its length (e.g. in meters) by performing a conversion from time to distance according to the speed of light in the fiber and the fact that light travels bidirectionally in a reflectometry application. The length of a pulse corresponds to the apparent width of a pulse on the OTDR trace. It also corresponds to the minimum length of fiber required to be able to see a valid backscatter level. For example, a pulse of 10 µs corresponds roughly to 1.0 km of pulse length. All of these representations are encompassed in the scope of the expression "pulsewidth".

Example 1

When multiple acquisitions are performed using different pulses, it is possible that some of the events will be seen by more than one acquisition. In this case, it is advantageous to determine which acquisition will provide which parameter value in the final result.

Figure 1B:
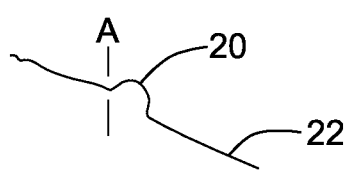
Figure 1C:
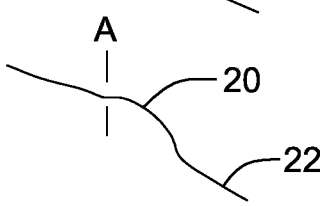

Referring to FIGS. 1a to 1c, there is shown a first example of an embodiment, where test pulses 1, 2 and 3 of increasing pulsewidths are used to characterize an event, such as for example a connector in the fiber. Each of the three illustrated traces show a peak 20 of similar width as the test pulse at location A. These peaks 20 are overlaid with the light backscattered along the fiber, showing as a slope 22 on the trace. The corresponding values for the quality factor are shown in TABLE 1 below.

TABLE 1

| Pulse | Measurement | Quality |
| --- | --- | --- |
| Pulse 1 | Location | 3 |
|  | Loss | 1 |
|  | Reflectance | 3 |
| Pulse 2 | Location | 2 |
|  | Loss | 3 |
|  | Reflectance | 2 |
| Pulse 3 | Location | 1 |
|  | Loss | 3 |
|  | Reflectance | 1 |

As can be seen, the location and reflectance of event A can be determined from pulse 1, which provides an "optimum" quality for this parameter. However, there is too much noise on the background backscattering signal to properly measure loss using Pulse 1. Loss is extracted from Pulse 2, which presents better quality criteria (higher SNR). This simple example illustrates the fact that not all measurements are extracted from the same acquisition.

Example 2

Figure 2A:
FIGS. 2a, 2b and 2c show an event along an optical link as it appears in the trace obtained from three acquisitions using test light pulses of different pulsewidths, according to a second example of an embodiment.
Figure 2B:
Figure 2C:
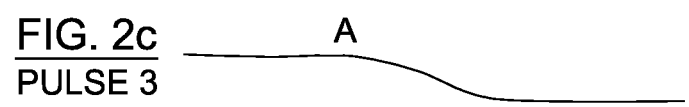

In some embodiments, the deriving of multiple target parameters may involve computing a value for a first target parameter using one of the light acquisitions, and computing a value for a second target parameter using another one of the light acquisitions. For example, when a quality factor such as the reflectance value is very small (similar or smaller than the backscattering level at the shortest pulse), it is possible that it will be visible only on the shortest pulse. This is the case in the example of FIGS. 2a to 2c, where the reflective peak 24 can only be seen on the trace from Pulse 1 on FIG. 2a. When this happens, measurement is only possible at the shortest pulse. In this case, as can be seen in FIGS. 2a to 2c and TABLE 2, the information from Pulse 1 will be used to determine the location and reflectance value of event A, whereas the corresponding loss value will be better determined from Pulse 2.

TABLE 2

| Pulse | Measurement | Quality |
|---|---|---|
| Pulse 1 | Location | 3 |
|  | Loss | 2 |
|  | Reflectance | 1 |
| Pulse 2 | Location | 2 |
|  | Loss | 3 |
|  | Reflectance | — |
| Pulse 3 | Location | 1 |
|  | Loss | 2 |
|  | Reflectance | — |

Of course, this step is not limited to the determination of location and loss as in example 2 above, but may be applied to other combinations of parameters.

Example 3

Figure 3A:
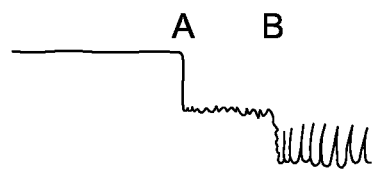
FIGS. 3a, 3b and 3c show two events along an optical link as they appear in the trace obtained from three acquisitions using test light pulses of different pulsewidths, according to a third example of an embodiment.
Figure 3B:
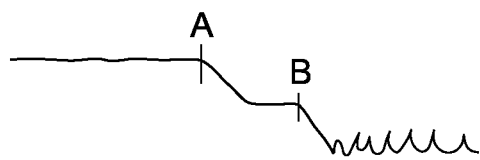
Figure 3C:

Referring to FIGS. 3a to 3c and TABLE 3, the third example presented illustrates how, in some situations, it is better to use two different acquisitions to extract the loss of a single event.

TABLE 3

| Pulse | Measurement | Quality A | Quality B | Quality A + B |
|---|---|---|---|---|
| Pulse 1 | Location | 3 | 1 | — |
|  | Loss | 2 | — | — |
| Pulse 2 | Location | 2 | 2 | — |
|  | Loss | 3 | 1 | 1 |
| Pulse 3 | Location | 1 | — | — |
|  | Loss | — | — | 3 |

In this example, two events, A and B, are present in the fiber link. The location of event A is best obtained from Pulse 1, whereas the location of event B is best obtained from Pulse 2. With respect to loss values, the information from Pulse 2 can be used to determine the loss associated with event A. However, none of the obtained traces provide enough data to determine the loss associated with event B in a satisfactory manner. The loss of event B is better estimated by taking the A+B loss from Pulse 3 and subtracting the A loss from Pulse 2. The direct measurement of the B loss on Pulse 2 would result in a less robust measurement, since the quality of the criteria would be poor.

Therefore, in some situations, the derivation of a target parameter may involve computing a value for this target parameter by combining information from more than one of the light acquisitions. This may further involve using information characterizing a different event in said optical fiber link, as in the example above.

Example 4

FIGS. 4a to 4d and TABLE 4 illustrate a situation similar to that of example 3. The loss of event B is better estimated by taking the loss of A+B and subtracting the loss of A. However this example differs from the previous one in that the A+B loss is not directly visible from Pulse 3: Pulse 3 does not display a backscatter level prior to event A.

This situation may arise from a number of reasons, for example:
A high receiver gain is used to measure weak signals towards the end of the OTDR trace, and the beginning of the trace is saturated;
The section of fiber before event A is shorter than the pulse width of pulse 3;

TABLE 4

| Pulse | Measurement | Quality A | Quality B | Quality A + B |
|---|---|---|---|---|
| Pulse 1 | Location | 3 | 2 | — |
|  | Loss | 2 | — | — |
| Pulse 2 | Location | 2 | 2 | — |
|  | Loss | 3 | — | 1 |
| Pulse 3 | Location | — | 1 | — |
|  | Loss | — | — | 3* |

When such a situation occurs, it can be resolved by applying normalization between acquisitions. Normalization consists of calibration of the power level scales (Y axis) between the different acquisitions. Referring to FIG. 4d, It can be seen that once all the traces are normalized on a same power scale, the power level which should have been seen in the saturated portion of the trace from Pulse 3 can be evaluated, the loss associated with A+B deduced and the loss of B calculated in the same manner as example 3.

Normalization between two acquisitions can be done by different means: by design (theoretically, based on knowledge of electronic gains and pulse width), through factory calibration, through trace comparison when a common section of fiber is visible on the two traces, or through additional specialized acquisitions that will bridge between the two optimal pulses. Of course, other normalization methods may be considered without departing from the scope of the invention.

Example 5

In some situations, it is not possible to measure the individual losses of two closely spaced events, but it is possible to locate them. Moreover, it may also be possible to measure individual event reflectance by combining the information obtained from two acquisitions, as shown here.

Referring to FIGS. 5a and 5b and to TABLE 5, in the illustrated example, reflective events C and D can be located on Pulse 1. The loss associated with C+D can be measured on Pulse 2.

TABLE 5

| Pulse | Measurement | Quality C | Quality D | Quality C + D |
|---|---|---|---|---|
| Pulse 1 | Location | 3 | 3 | — |
|  | Loss | — | — | — |
|  | Reflectance | — | — | — |
| Pulse 2 | Location | 2 | — | — |
|  | Loss | — | — | 3 |
|  | Reflectance | — | — | — |

The reflectance of C and D cannot be measured in individual acquisitions taken with Pulse 1 or Pulse 2. However, information from both acquisitions can be combined to measure reflectance.

As seen in FIGS. 5a and 5b, information on the loss along the fiber section extending between B and C is taken from Pulse 2. Based on the normalization of the acquisitions taken with Pulse 1 and Pulse 2, this information is used to make an estimate of the backscattered signal between B and C on Pulse 1. The height of peak C with respect to the backscattering level can then be measured, and the reflectance calculated (it is to be noted that reflectance measurement requires measuring the height of the peak above backscatter level prior to the event). A similar process can be applied to measure the reflectance of event D. However, the backscatter level prior to event D cannot be predicted with same accuracy because the loss of event C is unknown (only the loss of C+D is known). The backscatter prediction error can be minimized by assuming that the loss of C is half of the loss of C+D. The additional uncertainty of peak D height is +/−(C+D loss/2).

As mentioned above, another approach to obtain different acquisition conditions is to change the wavelength of the test light pulses. Embodiments of this aspect of the invention are provided in the examples below.

Example 6

An event may have been detected and characterized by two acquisitions, one at a first wavelength $\lambda_1$ and the other at a second wavelength $\lambda_2$. Even if both acquisitions are performed with the same pulsewidth, the location accuracy of the event may be better at a given wavelength than at the other, SNR being larger for one of the two wavelengths. Accordingly, it may be advantageous to evaluate the quality of the information obtained by each wavelength and decide which information is more reliable (this applies to location, which should be the same at each wavelength, but not to loss and reflectance, which can be different).

In the example of FIGS. 6a and 6b, it can be seen that the acquisition performed at $\lambda_1$ provides a signature with low noise (high SNR), whereas the signature at $\lambda_2$ has a much higher noise level (lower SNR). Even if event A is detected independently on both traces, the location of the event is more accurate on $\lambda_1$. Accordingly, the OTDR method uses the value of event A location found on $\lambda_1$, which applies to the location of event A on both $\lambda_1$ and $\lambda_2$.

In practice, the physical location of a given event should be independent of the test wavelength. However event locations found at each wavelength can vary slightly due to noise on the trace and precision of the event detection algorithm used. It is therefore of interest for an OTDR device to report a single value for location even if the OTDR performs acquisitions at many wavelengths.

Example 7

A variant of example 6 can be obtained by performing the light acquisitions at wavelengths $\lambda_1$ and $\lambda_2$ with different pulsewidths. In such a case, there may be a significant difference in the resulting return light in both acquisition conditions, since, for example, link loss may be wavelength dependent, and the laser power may be quite different. FIGS. 7a and 7b show a first acquisition made at $\lambda_1$ with a short pulse and a second acquisition made at $\lambda_2$ with a long pulse.

It may be advantageous to establish a quality factor for the precision of the location obtained from each light acquisition and to use the most reliable position information to characterize the event location. The quality factor in example 6 was the SNR; however, more complex quality criteria may be used. This is especially important when different pulsewidths are used, because shorter pulses will usually provide more precise location information.

As mentioned above, quality factors may be derived using a combination of one or many of the following data: noise on trace, SNR, sampling resolution, pulsewidth, bandwidth, loss of event, etc. It is also possible to define the final value for the location parameter based on a weighted average of all locations found with a weighting factor dependent on the quality factor. Of course, other algorithms or criteria may be considered without departing from the scope of the invention.

In example 7, therefore, since loss may be wavelength dependent, loss associated with event A at the first wavelength $\lambda_1$ is derived from the acquisition performed with Pulse 1 while loss at the second wavelength $\lambda_2$ is derived from the acquisition performed with Pulse 2. However, the location of event A, which is generally wavelength independent, can still be determined from Pulse 1, for both the wavelength $\lambda_1$ and wavelength $\lambda_2$.

Example 8

Referring to FIGS. 8a and 8b, another example of using multiple acquisitions performed with different wavelengths is given for the case where two closely spaced events (A and B) are tested at two different wavelengths. One wavelength may be able to discriminate the two events while the other wavelength only sees the combined loss. By merging the information from the two wavelengths, instead of leaving them in silos, it is possible to increase the quantity of information obtained, especially for the wavelength using a longer pulse.

TABLE 6

| Pulse | Measurement | Quality A | Quality B |
|---|---|---|---|
| Wavelength 1 | Location | 3 | 3 |
| (short pulse) | Loss | 3 | 3 |
| Wavelength 2 | Location | 2 | — |
| (long pulse) | Loss | 2 | — |

Measurement at $\lambda_2$ will only detect one event, positioned at the location of event A, and measure the loss which turns out to be the loss of A+B. Users of the OTDR will never know that there are in reality two events. By using the information extracted from wavelength 1, the result for $\lambda_2$ can be improved to display two separate events A and B, and clearly show the loss as being the loss of A+B.

Example 9

Referring to FIGS. 9a and 9b, another example of using multiple acquisitions performed with different wavelengths is shown for a case where a given event is detected on $\lambda_1$ but not on $\lambda_2$. This situation typically arises when the SNR on λ2 is below a detection threshold, and the detection algorithm does not find the event due to the level of noise. An aspect is that the knowledge of the presence of event A found on $\lambda_1$ allows the OTDR to measure event A on $\lambda_2$ acquisition, even in a situation where event A was not initially detected.

In FIGS. 9a and 9b it can be seen that event A is detected (and characterized) on $\lambda_1$; however it is not initially detected on $\lambda_2$. Knowledge of the presence of event A on $\lambda_1$ can be used to force the measurement of loss and reflectance of event A on $\lambda_2$.

Advantageously, by making use of multiple acquisitions performed at different wavelengths to characterize single event or multiple events, embodiments provide the following benefits:

Selecting acquisition with the optimum quality criteria (like SNR, resolution) to locate events (instead of having a location measured independently on each acquisition);

Allowing the characterization of an event at all wavelengths, even if the event was not initially detected at all wavelengths;

Detecting that some events are in reality composed of many sub-events when one wavelength has a better resolution than the others.

Device According to an Embodiment

In accordance with another aspect, there is also provided a multiple-acquisition OTDR device for testing an optical fiber link.

Figure 10:
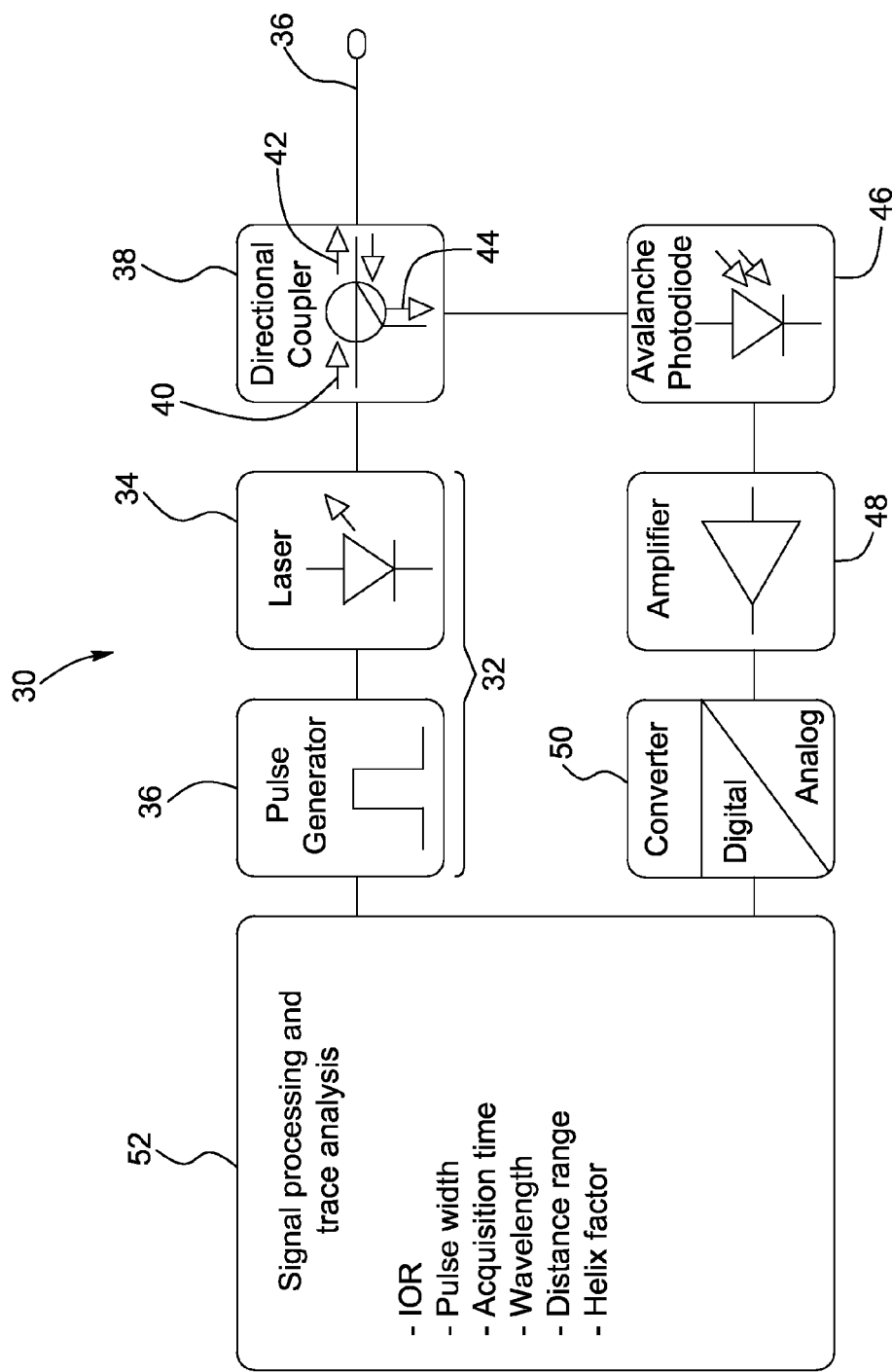
FIG. 10 is a schematic representation of an OTDR device according to an embodiment.

Referring to FIG. 10, there is shown an example of a device 30 which may be used to perform the above-described methods. The OTDR device 30 includes a light generating assembly 32, here embodied by a laser 34 driven by a pulse generator 36 to generate optical pulses having the desired characteristics. In one embodiment, the light generating assembly 32 is adapted to generate multiple test light pulses having different pulsewidths, for example through a proper control of the pattern produced by the pulse generator 36. In another embodiment, the light generating assembly 32 is adapted to generate multiple test light pulses having different wavelengths, for example by using a tunable laser or the like. The light generating assembly may also combine both pulsewidth and wavelength controlling capabilities. Of course, different and/or additional components may be provided in the light generating assembly, such as modulators, lenses, mirrors, wavelength selectors and the like.

In the illustrated embodiment, the laser 34 is coupled to the optical fiber link-under-test 36 through a directional coupler 38, such as, for example, a circulator or a 50/50 coupler, having three or more branches. The first branch 40 is connected to the laser 34 to receive the light pulses therefrom, the coupler 38 outputting these pulses to the second branch 42 which is connected to the optical fiber link 36. The second branch 42 also receives the return light signals from the optical fiber link 36, which is circulated and outputted to the third branch 44. The third branch 44 is connected to an appropriate detecting module, for example an avalanche photodiode 46, which detects the return light signal for each test light pulse. In the illustrated embodiment, the detected signals are amplified by an amplifier 48 and converted from analog to digital by a converter 50.

In some embodiments (not illustrated), an internal reference reflector can be used in a fourth branch of the directional coupler. This reference reflector allows fluctuations in OTDR power levels due to aging or thermal effects to be tracked and compensated by performing normalization between acquisitions, thereby providing more accurate measurements (see U.S. Pat. No. 5,754,284 (LEBLANC et al.)).

An analyzing module 52 for analyzing the detected return light signals is further provided. The analyzing module may be embodied by components, software or the like, and may be integral or external to the OTDR device 30. The analyzing module performs the calculations necessary to characterize the events along the optical fiber link. The analyzing module is therefore able to control the acquisition conditions for each light acquisition, by controlling the light generating assembly to generate test light pulses having either different pulsewidths, different wavelengths or both, from one acquisition to the next.

The analyzing module can further derive at least one of the loss parameter, the position parameter and the reflectance parameter characterizing the event, by performing the appropriate data processing and analysis, as will be readily understood by one skilled in the art. In one embodiment, the analyzing module may associate a quality factor to each parameter considered for each of the light acquisitions. It can then compare the quality factors associated with a target parameter for each of the light acquisitions, select one of these light acquisitions based on the associated quality factor for this target parameter, and compute a value for the target parameter based on the selected light acquisition. In an embodiment, the analyzing module can compute a value for a first target parameter using one of the light acquisitions and compute a value for a second target parameter using another one of the light acquisitions. In an embodiment, the analyzing module may also compute a value for a target parameter by combining information from more than one of the light acquisitions. Furthermore, the analyzing module may use information characterizing a different event in the optical fiber link to derive a target parameter of the event under consideration.

In the illustrated embodiment, the analyzing module is integrated in the signal processing and trace analysis hardware and software, which also control the pulse generator.

It is to be noted that the method and device described herein may use an iterative, i.e. adaptive selection of pulses based on events found on the trace by previous acquisitions. Alternatively, a "fixed recipe" may be used (for example: 10-100-1000 ns).

Of course, numerous modifications could be made to the embodiments above without departing from the scope of the present invention.

The invention claimed is:

1. An OTDR method for characterizing an event in an optical fiber link, comprising the steps of:
    a) performing a plurality of light acquisitions, each light acquisition comprising propagating test light pulses in the optical fiber link and detecting a return light signal from said optical fiber link for said test light pulses, different ones of said light acquisitions being performed using corresponding test light pulses having different pulsewidths; and
    for said event:
    b) selecting, among the plurality of light acquisitions, a first light acquisition performed using the test light pulses having the shortest pulsewidth while providing a corresponding return light signal having a signal to noise ratio above a location threshold, and deriving from said first light acquisition a location parameter characterizing said event; and
    c) selecting, among the plurality of light acquisitions, a second light acquisition different from the first light acquisition and performed using the test light pulses having the shortest pulsewidth while providing a corresponding return light signal having a signal to noise ratio above a loss threshold different from said location threshold, and deriving from said second light acquisition a loss parameter characterizing said event.

2. The OTDR method according to claim 1, wherein a value of the loss threshold is greater than a value of the location threshold.

3. The OTDR method according to claim 1, further comprising a step of:

d) selecting, among the plurality of light acquisitions, a third light acquisition performed using the test light pulses having the shortest pulsewidth while providing a corresponding return light signal having a signal to noise ratio above a reflectance threshold different from at least one of said location threshold and loss threshold, and deriving from said third light acquisition a reflectance parameter characterizing said event.

4. The OTDR method according to claim 3, wherein a value of the loss threshold is greater than a value the location threshold and a value of the reflectance threshold.

5. The OTDR method according to claim 1, wherein the plurality of light acquisitions is performed based on a predetermined routine.

6. The OTDR method according to claim 1, wherein the step of performing a plurality of light acquisitions comprises determining the pulsewidth of the test light pulses of at least one of said light acquisitions based on an analysis of the return light signal from a previous one of said light acquisitions.

7. A multiple-acquisition OTDR device for characterizing an event in an optical fiber link, the multiple-acquisition device comprising:
- a light source coupled to the optical fiber link for generating and propagating test light pulses in the optical fiber link for a plurality of light acquisitions;
- a light detecting assembly comprising a light detector configured to detect a return light signal from said optical fiber link for said test light pulses for each of said plurality of light acquisitions,
- said different ones of said plurality of light acquisitions using corresponding test light pulses having different pulsewidths; and
- a non-transitory computer readable storage medium with a computer program stored thereon, the program instructing one or more processors to analyze the detected return light signal with respect to said event, said analyzing the detected return light signal comprising:
  - selecting, among the plurality of light acquisitions, a first light acquisition performed using the test light pulses having the shortest pulsewidth while providing a corresponding return light signal having a signal to noise ratio above a location threshold, and deriving from said first light acquisition a location parameter characterizing said event; and
  - selecting, among the plurality of light acquisitions, a second light acquisition different from the first light acquisition and performed using the test light pulses having the shortest pulsewidth while providing a corresponding return light signal having a signal to noise ratio above a loss threshold different from said location threshold, and deriving from said second light acquisition a loss parameter characterizing said event.

8. The multiple-acquisition OTDR device according to claim 7, wherein a value of the loss threshold is greater than a value of the location threshold.

9. The multiple-acquisition OTDR device according to claim 7, wherein the analyzing the detected return light signal further comprises:
a) selecting, among the plurality of light acquisitions, a third light acquisition performed using the test light pulses having the shortest pulsewidth while providing a corresponding return light signal having a signal to noise ratio above a reflectance threshold different from at least one of said location threshold and loss threshold, and deriving from said third light acquisition a reflectance parameter characterizing said event.

10. The multiple-acquisition OTDR device according to claim 9, wherein a value of the loss threshold is greater than values of the location threshold and the reflectance threshold.

11. The multiple-acquisition OTDR device according to claim 7, wherein the plurality of light acquisitions is performed based on a predetermined routine.

12. The multiple-acquisition OTDR device according to claim 7, wherein the pulsewidth of the test light pulses of at least one of said light acquisitions is based on an analysis of the return light signal from a previous one of said light acquisitions.

13. The multiple-acquisition OTDR device according to claim 7, wherein the light source comprises a laser and wherein said laser is driven by a pulse generator.

14. The multiple-acquisition OTDR device according to claim 7, wherein the light detecting assembly further comprises an amplifier and an analog-to-digital converter.

15. A non-transitory computer readable storage medium with a computer program stored thereon, wherein the computer program is operable to perform an OTDR method for characterizing an event in an optical fiber link, and wherein the computer program includes instructions for instructing one or more processors to perform the steps of:
a) receiving data from a plurality of light acquisitions, wherein each light acquisition comprises propagating test light pulses in the optical fiber link and detecting a return light signal from said optical fiber link for said test light pulses,
wherein different ones of said light acquisitions are performed using corresponding test light pulses having different pulsewidths; and
for said event:
b) selecting, among the plurality of light acquisitions, a first light acquisition performed using the test light pulses having the shortest pulsewidth while providing a corresponding return light signal having a signal to noise ratio above a location threshold, and deriving from said first light acquisition a location parameter characterizing said event; and
c) selecting, among the plurality of light acquisitions, a second light acquisition different from the first light acquisition and performed using the test light pulses having the shortest pulsewidth while providing a corresponding return light signal having a signal to noise ratio above a loss threshold different from said location threshold, and deriving from said second light acquisition a loss parameter characterizing said event.

16. The computer readable storage medium according to claim 15, wherein a value of the loss threshold is larger than a value of the location threshold.

17. The computer readable storage medium according to claim 15, wherein the computer program further includes instructions for instructing one or more processors to perform a step of selecting, among the plurality of light acquisitions, a third light acquisition performed using the test light pulses having the shortest pulsewidth while providing a corresponding return light signal having a signal to noise ratio above a reflectance threshold different from at least one of said location threshold and loss threshold, and deriving from said third light acquisition a reflectance parameter characterizing said event.

18. The computer readable storage medium according to claim 17, wherein a value of the loss threshold is greater than values of the location threshold and the reflectance threshold.

\* \* \* \* \*